United States Patent
Momiyama

[11] 4,037,935
[45] July 26, 1977

[54] HIGH-SPEED ADJUSTABLE FOCUS TELEPHOTO OBJECTIVE LENS

[75] Inventor: Kikuo Momiyama, Yokohama, Japan

[73] Assignee: Canon Kabushiki Kaisha, Tokyo, Japan

[21] Appl. No.: 610,338

[22] Filed: Sept. 4, 1975

[30] Foreign Application Priority Data

Sept. 11, 1974 Japan .................. 49-104736

[51] Int. Cl.² ............................ G02B 13/02
[52] U.S. Cl. ....................... 350/176; 350/216; 350/220
[58] Field of Search ............ 350/176, 220, 214, 212, 350/216

[56] References Cited

U.S. PATENT DOCUMENTS

| 962,920 | 6/1910 | Von Rohr | 350/212 |
| 3,020,804 | 2/1962 | Cox et al. | 350/220 |
| 3,854,797 | 12/1974 | Yokota | 350/216 |
| 3,887,269 | 6/1975 | Nakagawa | 350/216 |

FOREIGN PATENT DOCUMENTS

176,092  4/1966  U.S.S.R. .................. 350/220

Primary Examiner—John K. Corbin
Assistant Examiner—Conrad Clark
Attorney, Agent, or Firm—Toren, McGeady and Stanger

[57] ABSTRACT

A telephoto objective lens comprising a normally stationary front lens group having a positive power and a rear lens group having a negative power axially movable for focusing, the front lens group including at least two positive members and at least one negative member, and the rear lens group including at least one positive member and at least one negative member. The rear lens group has a negative meniscus configuration as a whole with the first refracting surface counting from the front being convex to the front and with the rearmost surface being concave to the rear. As the objective lens is focused from the position for an object at infinity to the position for a close object, only the rear lens group is moved toward the image plane.

11 Claims, 22 Drawing Figures

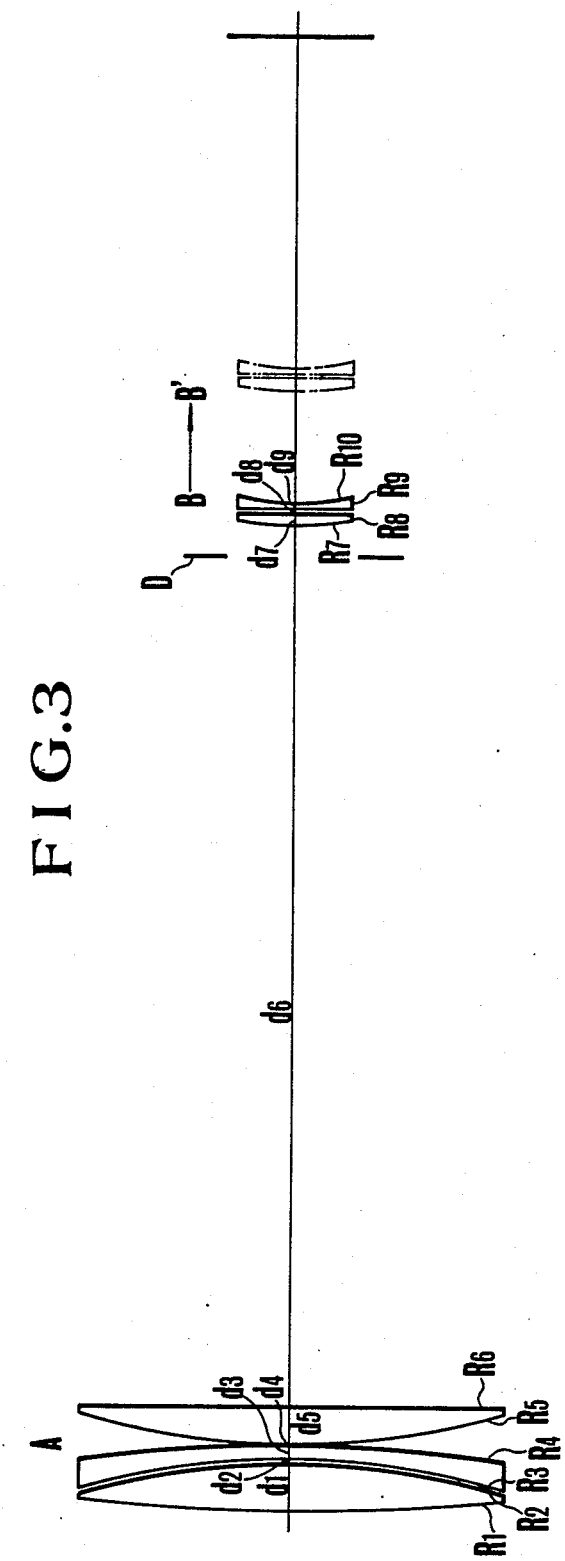

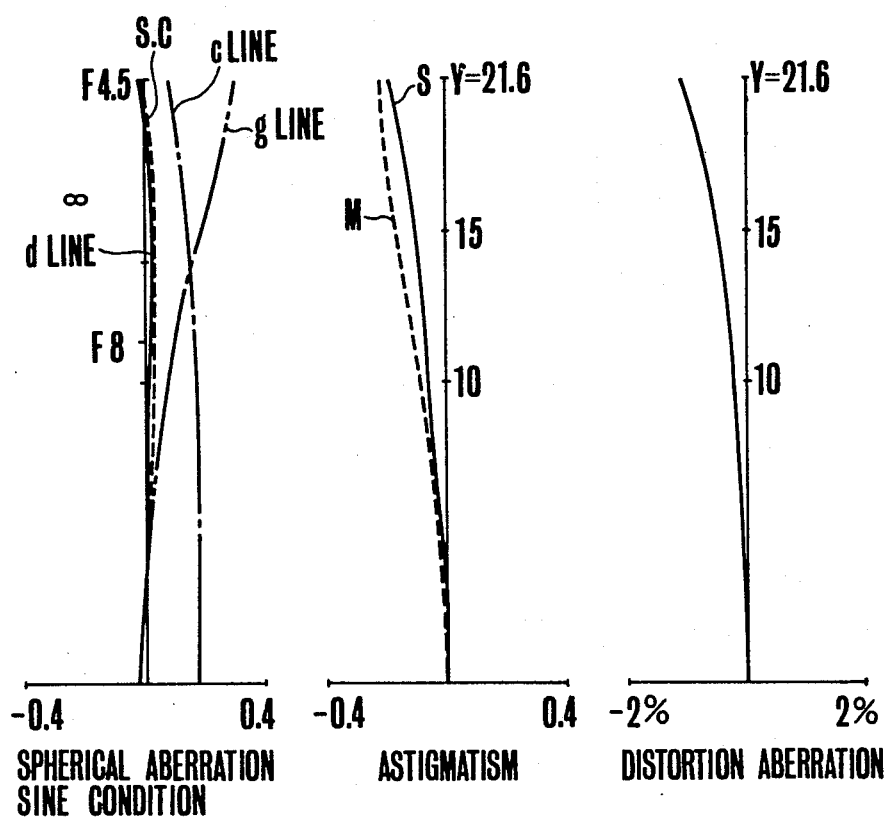

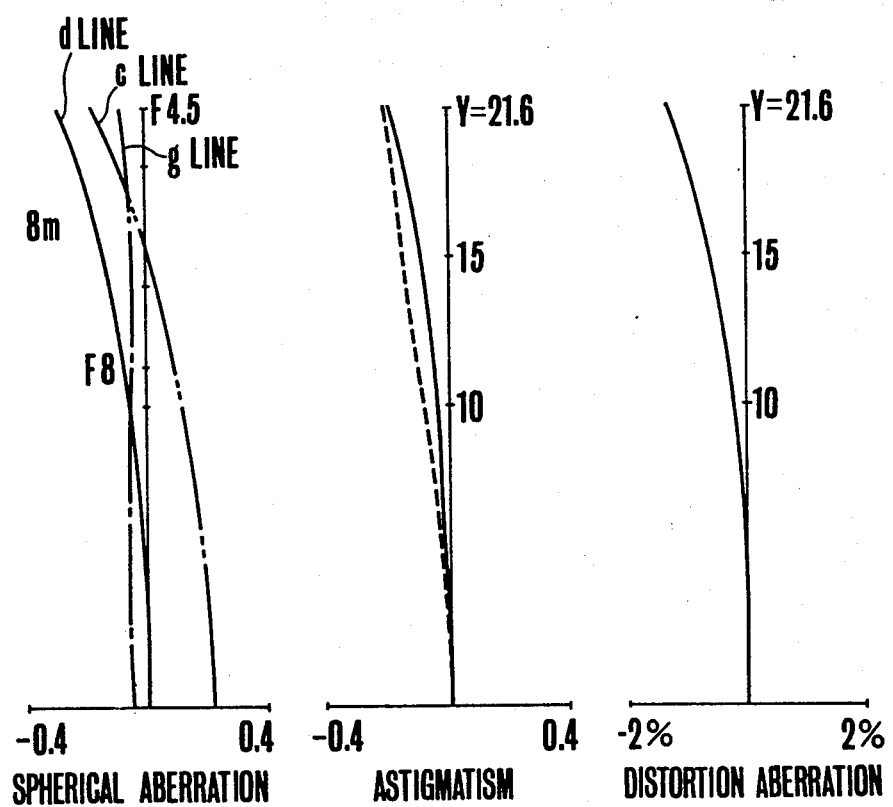

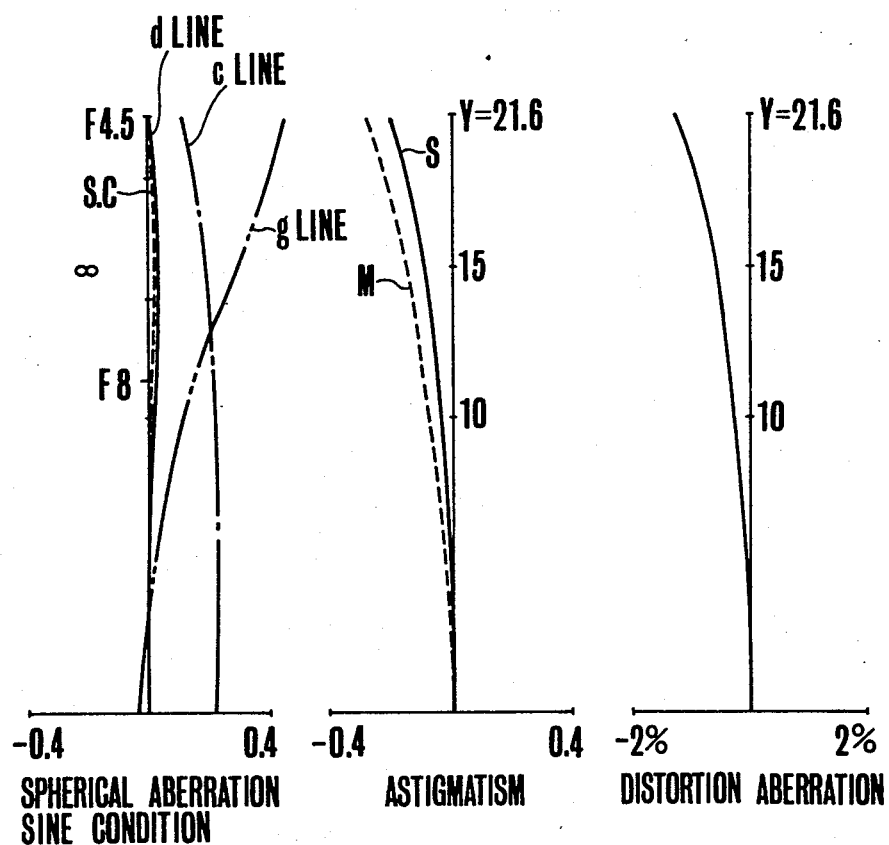

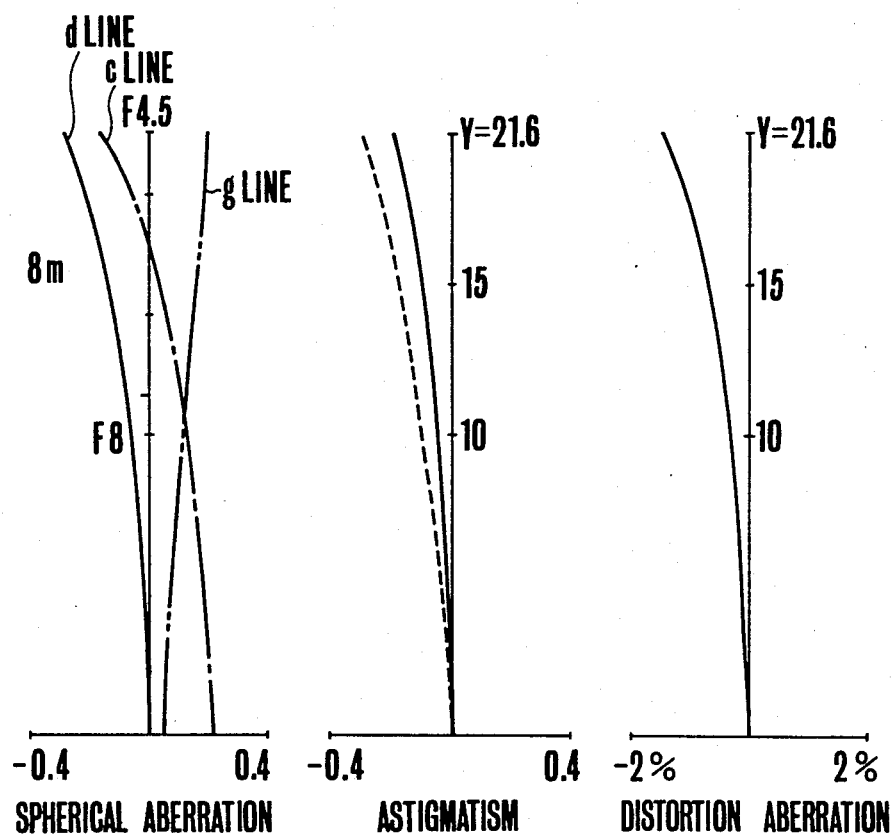

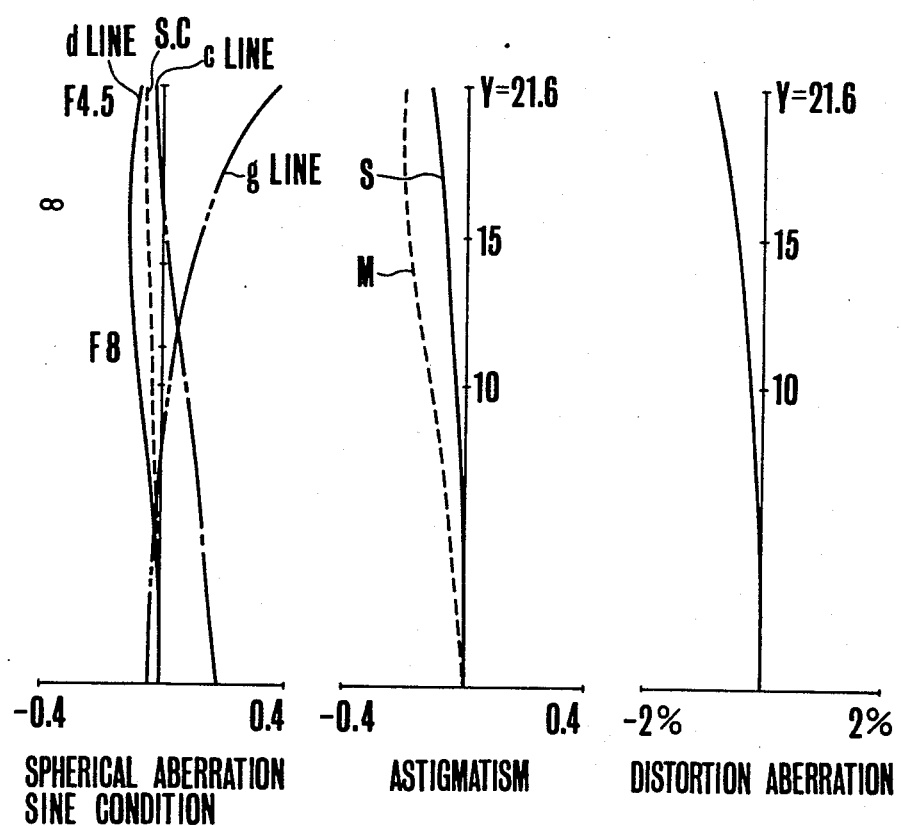

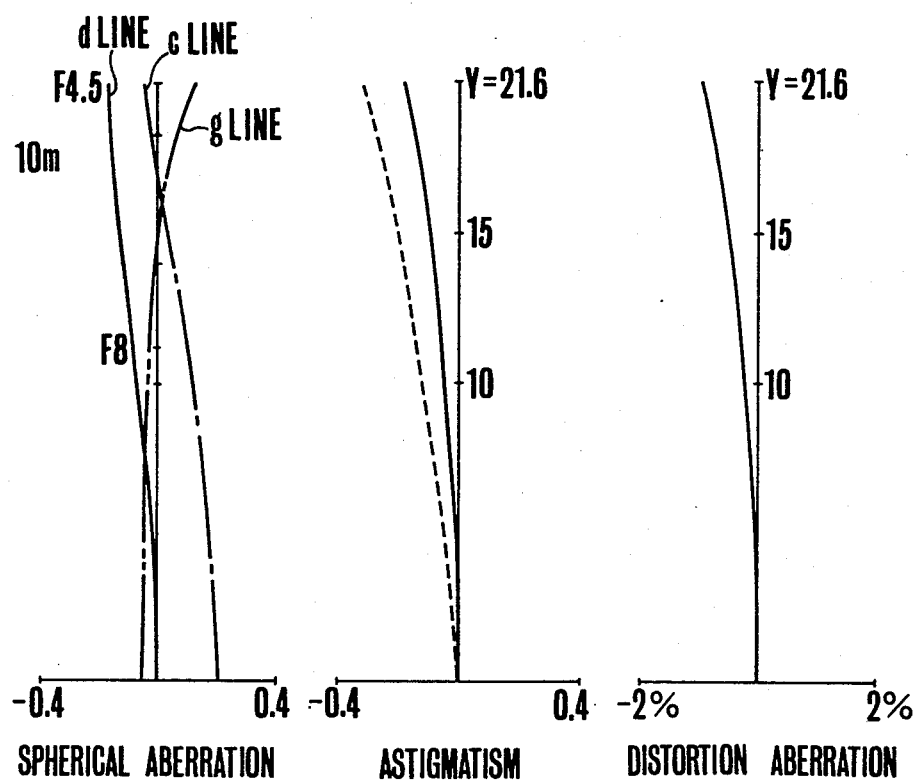

HIGH-SPEED ADJUSTABLE FOCUS TELEPHOTO OBJECTIVE LENS

BACKGROUND OF THE INVENTION

This invention relates to optical objectives, and more particularly, to a telephoto objective having a stationary front lens group of positive power and a rear lens group of negative power movable for focusing.

Although most optical objectives are bodily movable for focusing purposes, the focusing can be otherwise achieved by axial movement of either the front or the rear lens group of the optical objective.

In telephoto objectives, if made bodily movable for focusing, the amount of axial movement of the objective throughout the entire focusing range tends to increase, and this, in turn, calls for increases in the weight and bulk of the objective and the driving torque of its focusing mechanism such as those including helicoid structure as well as in the production cost thereof, thereby it being made more difficult to keep the weight and bulk of the complete objective including its mechanical mounting and focusing mechanism within easily manageable proportions.

In the case of a telephoto objective of the type in which the provision for focusing is made at a rear lens group thereof, it is possible to minimize the amount of focusing movement and further to reduce the size and cost of the focusing mechanism therefor, because of the relatively small weight and bulk of the rear lens group, which in turn results in a reduction of the driving torque which would be otherwise necessary for the focusing thereof. This provides an advantage of facilitating high-speed focus adjustment of the objective. Another advantage of this type telephoto objective is that the front lens group which is of a relatively large weight and bulk may be supported in fixedly secured relation with a camera body to minimize the probability of producing a jiggle or oscillation of the image at the focal plane by small accidental motions of the objective and camera assembly which is otherwise encountered, particularly when the objective is telephoto in nature. This type of telephoto objective is, however, susceptible to large variation of aberrations and particularly spherical aberration during focusing, and consequently high grade imagery cannot be preserved throughout. This is particularly true when the objective is constructed as comprising a front lens group which has a positive power and a rear lens group which has a negative power for the purpose of minimizing the overall length of the objective. In the objective of such construction, the front lens group produces a negative spherical aberration, while the rear lens group produces a positive spherical aberration, whereby the best balance between them is usually effected at a focusing position for an object at infinity. As the objective is focused from the infinity distant position to a close distance position, however, the height of incidence of an axial ray upon the rear lens group is decreased causing the rear lens group to contribute a decreased positive spherical aberration to the whole lens system. As a result, the image spherical aberration is remarkably undercorrected.

SUMMARY OF THE INVENTION

The present invention has for the general object to provide a telephoto objective lens having a rear lens group movable for focusing purposes and which is well corrected for high grade imaging performance throughout the entire focusing range.

To achieve this, the rear lens group is corrected for aberrations to a large extent, with a construction such that the rear lens group has a negative power, and the strongest convergent surface among the surfaces in this group is convex to the front, and the strongest divergent surface which is located on the image side of the strongest convergent surface is concave to the rear. By the term "strong" as herein used, it is meant that the radius of curvature of the surface is small. For the purpose of better understanding this, reference to FIG. 1 may be had wherein a surface designated by $R_7$ corresponds to the convergent surface, and a surface designated by $R_9$ corresponds to the divergent surface. With this rear lens group, it is impossible to provide a decreased variation of positive spherical aberration during focusing, as the difference between the maximum and minimum spherical aberrations occurring at different heights of incidence of an axial ray on the rear lens group depending upon the extent to which the rear lens group is corrected for spherical aberration.

On the other hand, the front lens group is corrected for spherical aberration by itself with resulting further decreased image spherical aberration of the complete telephoto objective. For this purpose, it is preferred to construct the front lens group from at least two positive lenses and at least one negative lens. For facilitating chromatic aberration correction, it is preferred to construct the rear lens group from at least one positive lens and at least one negative lens.

The above and other features of the present invention will be described in greater detail with reference to the accompanying drawings in which:

BRIEF DESCRIPTION OF THE DRAWINGS

FIG. 3 is an axial sectional view of still another embodiment of the invention.

FIGS. 4, 5 and 6 are aberration curves of the objective of FIG. 1 occurring in a focusing position for an object at infinity.

FIG. 7, FIG. 8 and FIG. 9 are aberration curves of the objective of FIG. 1 occurring in a focusing position for a close object at a distance of 8 meters.

FIGS. 10, 11 and 12 are aberration curves of the objective of FIG. 2 occurring in a focusing position for an object at infinity.

FIGS. 13, 14 and 15 are aberration curves of the objective of FIG. 2 occurring in a focusing position for an object distance of 8 meters.

FIGS. 16, 17 and 18 are aberration curves of the objective of FIG. 3 occurring in a focusing position for an object at infinity.

FIGS. 19, 20 amd 21 are aberration curves of the objective of FIG. 3 occurring in a focusing position for an object at a distance of 12 meters.

DESCRIPTION OF THE PREFERRED EMBODIMENTS

Figures 1, 2:
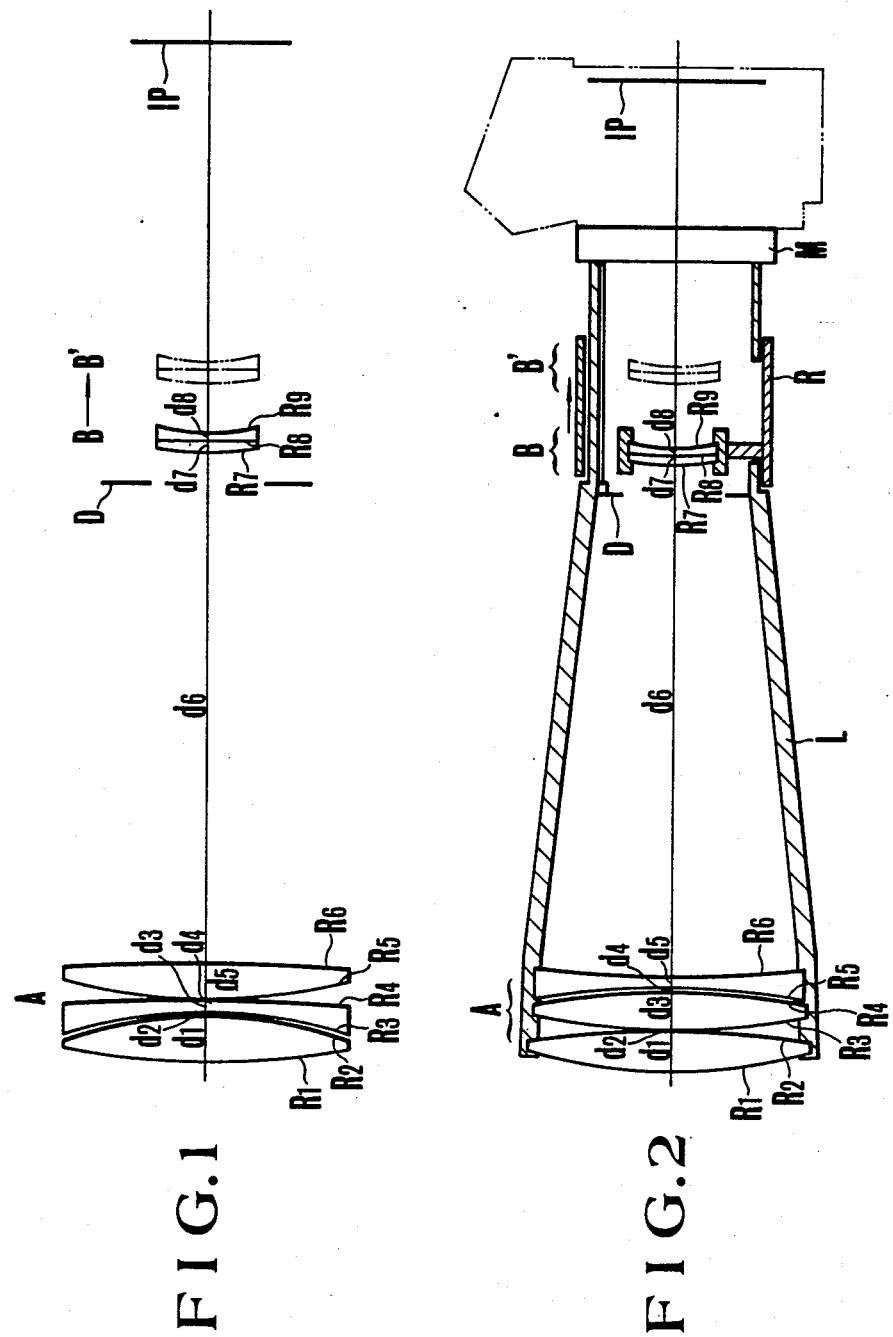
FIG. 1 is an axial sectional view of a telephoto objective according to one embodiment of the present invention.
FIG. 2 is an axial sectional view of another embodiment of the invention shown as mounted in a lens barrel with a focusing mechanism for a single lens reflex camera.

Referring to FIGS. 1, 2 and 3, there are shown three embodiments of the present invention each providing a telephoto objective adapted for use with a photographic camera and which comprises a normally stationary front lens group of positive power designated by A and a rear lens group of negative power designated by B moveable for focusing purposes. The front lens group A consists of two positive lens elements and one negative lens element. The rear lens group B consists of two lens elements which are either cemented together at their adjoining surfaces as shown in FIGS. 1 and 2, or air-spaced from each other as shown in FIG. 3, and is substantially configured to a negative meniscus lens as a whole, with the first refracting surface counting from the front being convex to the front, and with the rearmost refracting surface being concave to the rear, whereby the radii of curvature of the first and rearmost surfaces are smaller than that of the cemented surface, or those of the confronting surfaces thereof.

In focusing the telephoto objective from an object at infinity to a close object at a distance of 8 or 12 meters, the rear lens group B is moved behind a diaphragm D from a position marked in solid lines to a position marked by dashed lines by means, for example, including a slidable focusing ring R associated with a lens barrel L which is assembled with a camera body at a fitting ring M as shown in FIG. 2. The amount of focusing movement $\Delta X$ of the rear lens group B may be expressed by the following formulae $$\Delta X = \frac{-2}{K(1 + \sqrt{1 - \frac{4J}{K^2}})}$$

$$K \equiv \frac{1}{F} \cdot \frac{1}{Fb} (\frac{S_1}{Fa} + 1)$$

$$J \equiv \frac{1}{Fa} (\frac{S_1}{Fa} + 1) - \frac{1}{F} (\frac{S_1 - O_1}{F} + 1)$$

wherein $S_1$ is the object distance as measured from the vertex of the first refracting surface of the objective; $F$ is the focal length of the complete objective occurring when focused at infinity; $Fa$ is the focal length of the front lens group; $Fb$ is the focal length of the rear lens group; and $O_1$ is the interval between the primary principal point of the complete objective focused at infinity and the vertex of the first refracting surface of the objective, the value of $\Delta X$ taking a plus sign when measuring the movement amount in the direction from the front to the rear.

In order to facilitate the solution of aberrational problems, it is preferred that the rear lens group and its lens components satisfy the following relationships:

$$0.4F < |Fb| < 0.9F, \; Fb < 0 \quad \text{(a)}$$

$$3.5 < \frac{Rc + Rv}{Rc - Rv} < 8 \quad \text{(b)}$$

$$-0.05 < \frac{F}{Fp \cdot Vp} + \frac{F}{Fn \cdot Vn} < 0.05 \quad \text{(c)}$$

wherein $F$ is the focal length of the complete objective when focused at infinity; $Fb$ is the focal length of the rear lens group; $Rv$ is the radius of curvature of a strong convex surface of the rear lens group; $Rc$ is the radius of curvature of a strong concave surface of the rear lens group; $Fp$ and $Vp$ are the overall focal length and mean Abbe number of positive lens or lenses comprising the rear lens group respectively; and $Fn$ and $Vn$ are the overall focal length and mean Abbe number of negative lens or lenses comprising the rear lens group, respectively.

Condition (a) assists towards achievement of a good compromise between the requirements of providing a large range of focusing adjustments with relatively small axial translation of the rear lens group B and of providing the possibility of achieving a high standard of stabilization of the aberrations throughout the entire focusing range. Although the amount of axial translation of the rear lens group can further be decreased by decreasing the absolute focal length $|Fb|$ of the rear lens group from the lower limit 0.4F, it is made more difficult to compensate the variation with focusing of aberrations. Conversely, the use of a lens group having an absolute focal length longer than the upper limit 0.9F as the rear lens group requires a focusing mechanism of increased size due to the increased axial translation of the rear lens group.

In compensating for variation with focusing of aberrations, it is required that various residual aberrations and particularly spherical aberration ascribable to the rear lens group must be decreased. For this reason, the rear lens group must be designed to have a concave meniscus configuration directed rearwardly toward the image plane, as satisfying condition (b). When the upper limit of condition (b) is violated, residual spherical aberration ascribable to the rear lens group is objectionably increased with resulting increased variation of aberration during focusing. When the lower limit is violated, a difficult problem arises in balancing residual aberrations of the complete objective throughout the entire focusing range.

For stabilization with focusing of chromatic aberrations, it is preferred to correct the rear lens group for achromatizm to a modest degree as defined by condition (c).

Three examples of embodiments of the invention represented in FIGS. 1, 2 and 3 may be constructed in accordance with the numerical data given in Tables 1, 3 and 5 below respectively, in which $R_1, R_2 \ldots$ designate the radii of curvature of the individual surfaces counting from the front, the negative sign indicating that the surface is concave to the front; $d_1, d_2 \ldots$ designate the axial lens thicknesses of the individual elements, or air separations between the components of the objective; $N_1, N_2 \ldots$ and $V_1, V_2 \ldots$ respectively designate the refractive indices for the sodium d-line of the spectrum and the Abbe numbers of the materials of which the various elements of the objective are made, and in addition the variation of an axial air separation between the front and rear lens group during focusing. The aberration coefficients of the objectives of FIGS. 1, 3 and 5 are given in Tables 2, 4 and 6 respectively, in which I: Spherical aberration; II: Coma; III: Astigmatism; P: Petzval sum; and V: Distortion as related to object at infinity.

EXAMPLE I

Table 1

| (for FIG. 1) | | | |
|---|---|---|---|
| Total focal length f = 400 | | F-number: 4.5 | |
| $R_1 =$ 269.35 | $d_1 =$ 15.0 | $N_1 =$ 1.43387 | $V_1 =$ 95.2 |

Table 1-continued
(for FIG. 1)

| | | | | | | | |
|---|---|---|---|---|---|---|---|
| $R_2 =$ | −167.16 | $d_2 =$ | 0.57 | | | | |
| $R_3 =$ | −175.34 | $d_3 =$ | 5. | $N_2 =$ | 1.8061 | $V_2 =$ | 40.9 |
| $R_4 =$ | −582.43 | $d_4 =$ | 0.5 | | | | |
| $R_5 =$ | 221.05 | $d_5 =$ | 11.0 | $N_3 =$ | 1.48749 | $V_3 =$ | 70.1 |
| $R_6 =$ | −1181.46 | $d_6 =$ | variable | | | | |
| $R_7 =$ | 78.47 | $d_7 =$ | 4. | $N_4 =$ | 1.70154 | $V_4 =$ | 41.1 |
| $R_8 =$ | 612.19 | $d_8 =$ | 2.5 | $N_5 =$ | 1.713 | $V_5 =$ | 53.9 |
| $R_9 =$ | 54.91 | | | | | | |

Lens separation during focusing

| Object distance from image plane | $d_6$ | f |
|---|---|---|
| Infinity | 170.66 | 400 |
| 8 meters | 192.69 | 359.5 |

Table 2

| Surface No. | I | II | III | P | V |
|---|---|---|---|---|---|
| 1 | 0.691 | −0.328 | 0.156 | 0.449 | −0.287 |
| 2 | 21.450 | −29.497 | 40.562 | 0.724 | −56.773 |
| 3 | −25.505 | 35.242 | −48.695 | −1.018 | 68.691 |
| 4 | 0.511 | −1.052 | 2.164 | 0.306 | −5.083 |
| 5 | 0.312 | −0.114 | 0.042 | 0.593 | −0.234 |
| 6 | 2.514 | −4.243 | 7.163 | 0.110 | −12.278 |
| 7 | −0.021 | −0.178 | −1.516 | 2.101 | 4.959 |
| 8 | −0.020 | 0.021 | −0.023 | 0.002 | 0.021 |
| 9 | 0.051 | 0.132 | 0.340 | −3.032 | −6.903 |
| Σ | −0.015 | −0.018 | 0.194 | 0.237 | −7.888 |

EXAMPLE II

TABLE 3
(for FIG. 2)

Total focal length f = 400−356.5    F-number : 4.5

| | | | | | | | |
|---|---|---|---|---|---|---|---|
| $R_1 =$ | 174.03 | $d_1 =$ | 13.0 | $N_1 =$ | 1.43387 | $V_1 =$ | 95.2 |
| $R_2 =$ | −599.39 | $d_2 =$ | 0.5 | | | | |
| $R_3 =$ | 224.05 | $d_3 =$ | 12.5 | $N_2 =$ | 1.48749 | $V_2 =$ | 70.1 |
| $R_4 =$ | −252.26 | $d_4 =$ | 1.08 | | | | |
| $R_5 =$ | −261.06 | $d_5 =$ | 5. | $N_3 =$ | 1.8061 | $V_3 =$ | 40.9 |
| $R_6 =$ | 892.27 | $d_6 =$ | variable | | | | |
| $R_7 =$ | 69.67 | $d_7 =$ | 3. | $N_4 =$ | 1.7552 | $V_4 =$ | 27.5 |
| $R_8 =$ | 97.92 | $d_8 =$ | 2.5 | $N_5 =$ | 1.7725 | $V_5 =$ | 49.7 |
| $R_9 =$ | 51.80 | | | | | | |

Lens separation during focusing

| Object distance from image plane | $d_6$ | f |
|---|---|---|
| Infinity | 169.7 | 400 |
| 8 meters | 195.7 | 356.5 |

Table 4

| Surface No. | I | II | III | P | V |
|---|---|---|---|---|---|
| 1 | .2.562 | −2.146 | 1.797 | 0.695 | −2.088 |
| 2 | 2.902 | −5.163 | 9.185 | 0.201 | −16.698 |
| 3 | −0.066 | −0.064 | −0.062 | 0.585 | 0.507 |
| 4 | 32.868 | −48.426 | 1.348 | 0.519 | −105.886 |
| 5 | −39.041 | 57.621 | −85.041 | −0.683 | 126.519 |
| 6 | 0.734 | −1.722 | 4.036 | −0.200 | −8.991 |
| 7 | −0.037 | −0.241 | −1.547 | 2.470 | 5.911 |
| 8 | −0.000 | 0.005 | −0.030 | 0.022 | 0.045 |
| 9 | 0.057 | 0.156 | 0.425 | −3.365 | −7.996 |
| Σ | −0.020 | 0.018 | 0.111 | 0.245 | −8.677 |

EXAMPLE III

Table 5
(for FIG. 3)

Total focal length f = 600−509.7    F-number = 4.5

| | | | | | | | |
|---|---|---|---|---|---|---|---|
| $R_1 =$ | 751.56 | $d_1 =$ | 16. | $N_1 =$ | 1.43387 | $V_1 =$ | 95.2 |
| $R_2 =$ | −241.19 | $d_2 =$ | 0.5 | | | | |
| $R_3 =$ | −246.4 | $d_3 =$ | 5. | $N_2 =$ | 1.8061 | $V_2 =$ | 40.9 |
| $R_4 =$ | −517.34 | $d_4 =$ | 0.5 | | | | |
| $R_5 =$ | 270.97 | $d_5 =$ | 12. | $N_3 =$ | 1.43387 | $V_3 =$ | 95.2 |
| $R_6 =$ | −3511.86 | $d_6 =$ | variable | | | | |

Table 5-continued
(for FIG. 3)

| | | | | | | | |
|---|---|---|---|---|---|---|---|
| $R_7 =$ | 106.09 | $d_7 =$ | 4. | $N_4 =$ | 1.72342 | $V_4 =$ | 38.0 |
| $R_8 =$ | 463.13 | $d_8 =$ | 0.5 | | | | |
| $R_9 =$ | 399.18 | $d_9 =$ | 2.5 | $N_5 =$ | 1.6935 | $V_5 =$ | 53.3 |
| $R_{10} =$ | 67.67 | | | | | | |

Lens separation during focusing

| Object distance from image plane | $d_6$ | f |
|---|---|---|
| Infinity | 294.2 | 600 |
| 10 meters | 336.0 | 509.7 |

Table 6

| Surface No. | I | II | III | P | V |
|---|---|---|---|---|---|
| 1 | 0.107 | −0.044 | 0.018 | 0.241 | −0.106 |
| 2 | 18.801 | −35.793 | 68.142 | 0.752 | −131.160 |
| 3 | −23.078 | 44.008 | −83.922 | −1.086 | 162.109 |
| 4 | 1.358 | −3.095 | 7.075 | 0.517 | −17.359 |
| 5 | 0.835 | −0.902 | 0.974 | 0.670 | −1.777 |
| 6 | 1.908 | −4.327 | 9.809 | 0.051 | −22.354 |
| 7 | −0.002 | −0.072 | −2.096 | 2.373 | 7.980 |
| 8 | 1.475 | −2.458 | 4.096 | −0.543 | −5.919 |
| 9 | −1.350 | 2.323 | −3.999 | 0.615 | 5.823 |
| 10 | 0.042 | 0.141 | 0.472 | −3.630 | −10.575 |
| Σ | 0.093 | −0.220 | 0.571 | −0.038 | −13.340 |

Figure 22:
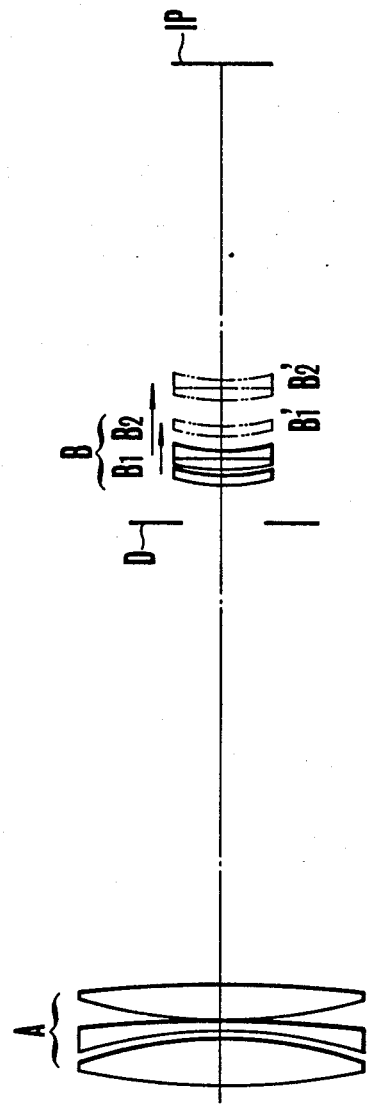
FIG. 22 is an axial sectional view of a telephoto objective of a type different from the above showing the effectiveness of the present invention.

The present invention is particularly concerned with the rear lens group provided to facilitate focusing with improved stabilization of the image aberrations. In this respect, the rear lens group B is capable of variation and can be split into two parts, for example, two negative meniscus members $B_1$ and $B_2$, as shown in FIG. 22, which are moved for focusing purposes in differential relation to each other and with reference to the front lens group, thereby giving an advantage of improving the state of correction of the image aberrations. This aberration corrected method is usually called "floating".

The basic construction of telephoto objective lens described is applicable with substantially equivalent result to another type of telephoto objective having a meniscus lens member of almost zero power with its convex surface rearwardly directed to the image plane, such meniscus lens being positioned just in front of or behind the moveable rear lens group without substantially affecting the aberrations.

What is claimed is:

1. A high-speed focus adjustable telephoto objective lens, comprising:
  a fixed lens group which has a positive refracting power and has at least one negative lens, said fixed lens group further being fixed at a position separated from the image surface by a prescribed length,
  a movable lens group, which has a negative refracting power and has at least one positive element lens and at least one negative element lens, wherein the front surfaces contacting air of these element lenses have their convex planes facing toward an object and the rear faces thereof contacting air have their concave planes facing toward an image, said movable lens group being located at an object side on an axis being separated from said fixed lens group, and the diameters of the element lenses within the movable lens group being smaller than the diameters of the lenses within the fixed lens group,
  whereby said movable lens group is shifted toward an object as said telephoto lens is refocused from an object at far distance to an object at close distance.

2. A high-speed focus adjustable telephoto objective lens, comprising:
   a front lens group which has a positive refracting power and consists of a plurality of lenses, said front lens group further being fixed at a position having a prescribed distance from the image surface of said objective lens, and
   a rear lens group which has a negative refracting power and has at least one positive lens and at least one negative lens, wherein the frontmost lens surface within this group has its convex plane facing an object side and has a radius of curvature being smaller than that of said frontmost lens surface,
   whereby as said objective lens is focused from an object at infinity to an object at a close distance, said rear lens group is moved rearwardly toward the image surface along an optical axis of said objective, and the amount of shifting $\Delta X$ of said rear lens is as follows:

$$\Delta X = \frac{-2}{K(1 + \sqrt{1 - \frac{4J}{K^2}})}$$

$$K \equiv \frac{1}{F} \cdot \frac{1}{Fb} (\frac{S_1}{Fa} + 1)$$

$$J \equiv \frac{1}{Fa} (\frac{S_1}{Fa} + 1) - \frac{1}{F} (\frac{S_1 - O_1}{F} + 1)$$

wherein $S_1$ is the object distance as measured from the vertex of the first refracting surface of the objective; $F$ is the focal length of the complete objective occurring when focused at infinity; $Fa$ is the focal length of the front lens group; $Fb$ is the focal length of the rear lens group; and $O_1$ is the interval between the primary principal point of the complete objective focused at infinity and the vertex of the first refracting surface of the objective, the value of $\Delta X$ taking a plus sign when measuring the movement amount in the direction from the front to the rear.

3. A high-speed focus adjustable telephoto objective lens according to claim 2, wherein said front lens group has a bi-convex lens, a negative meniscus lens of forward concavity and a positive lens of forward convexity arranged in this order from the front, and said rear lens group has a positive lens of forward convexity and a negative lens of rearward concavity arranged in this order from the front.

4. A high-speed focus adjustable telephoto objective lens according to claim 3, wherein said positive and negative lenses in said rear lens group are cemented together at their adjoining surfaces.

5. A high-speed focus adjustable telephoto objective lens according to claim 2, wherein said front lens group has two bi-convex lenses and a negative lens of forward concavity arranged in this order from the front, and said rear lens group has a positive lens of forward convexity and a negative lens of rearward concavity arranged in this order from the front.

6. A high-speed focus adjustable telephoto objective lens according to claim 5, wherein said positive and negative lenses in said rear lens group are cemented together at their adjoining surfaces.

7. A telephoto objective lens according to claim 2, in which said negative element lens of said movable lens group is located at a position closer to an image than the positive element lens of said movable lens group.

8. A telephoto objective lens according to claim 2, in which the positive element lens of said movable lens group and the negative element lens of the same are cemented together.

9. A high-speed focus adjustable telephoto objective lens with the various elements thereof having the characteristics and their spatial relationships to each other which are substantially of the proportions indicated by the numerical data in the following table:

| Total focal length f = 400 | | | F-number : 4.5 | |
|---|---|---|---|---|
| $R_1 =$ 269.35 | $d_1 =$ 15.0 | $N_1 =$ 1.43387 | $V_1 =$ 95.2 |
| $R_2 =$ −167.16 | $d_2 =$ 0.57 | | |
| $R_3 =$ −175.34 | $d_3 =$ 5. | $N_2 =$ 1.8061 | $V_2 =$ 40.9 |
| $R_4 =$ −582.43 | $d_4 =$ 0.5 | | |
| $R_5 =$ 221.05 | $d_5 =$ 11.0 | $N_3 =$ 1.48749 | $V_3 =$ 70.1 |
| $R_6 =$ −1181.46 | $d_6 =$ variable | | |
| $R_7 =$ 78.47 | $d_7 =$ 4. | $N_4 =$ 1.70154 | $v_4 =$ 41.1 |
| $R_8 =$ 612.19 | $d_8 =$ 2.5 | $N_5 =$ 1.713 | $V_5 =$ 53.9 |
| $R_9 =$ 54.91 | | | |

| Lens separation during focusing | | |
|---|---|---|
| Object distance from image plane | $d_6$ | f |
| Infinity | 170.66 | 400 |
| 8 meters | 192.69 | 359.5 | in which the radii of curvature R of each element surface are given with the respective surfaces being numbered from front to rear and being identified by the respective numeral subscripts, the axial separations d between successive surfaces are given with the respective numeral subscripts counting from front to rear, and the refractive indices N for the sodium d-line of the spectrum and Abbe numbers V of the materials of which the various elements are made are given with the respective numeral subscripts successively from front to rear.

10. A high-speed focus adjustable telephoto objective lens with the various elements thereof having the characteristics and their spatial relationships to each other which are substantially of the proportions indicated by the numerical data in the following table:

| Total focal length f = 400–356.5 | | | F-number : 4.5 | |
|---|---|---|---|---|
| $R_1 =$ 174.03 | $d_1 =$ 13.0 | $N_1 =$ 1.43387 | $V_1 =$ 95.2 |
| $R_2 =$ −599.39 | $d_2 =$ 0.5 | | |
| $R_3 =$ 224.05 | $d_3 =$ 12.5 | $N_2 =$ 1.48749 | $V_2 =$ 70.1 |
| $R_4 =$ −252.26 | $d_4 =$ 1.08 | | |
| $R_5 =$ −261.06 | $d_5 =$ 5. | $N_3 =$ 1.8061 | $V_3 =$ 40.9 |
| $R_6 =$ 892.27 | $d_6 =$ variable | | |
| $R_7 =$ 69.67 | $d_7 =$ 3. | $N_4 =$ 1.7552 | $V_4 =$ 27.5 |
| $R_8 =$ 97.92 | $d_8 =$ 2.5 | $N_5 =$ 1.7725 | $V_5 =$ 49.7 |
| $R_9 =$ 51.80 | | | |

| Lens separation during focusing | | |
|---|---|---|
| Object distance from image plane | $d_6$ | f |
| Infinity | 169.7 | 400 |
| 8 meters | 195.7 | 356.5 |

11. A high-speed focus adjustable telephoto objective lens with the various elements thereof having the characteristics and their spatial relationships to each other which are substantially of the proportions indicated by the numerical data in the following table:

| Total focal length f = 600–509.7 | | | F-number = 4.5 | |
|---|---|---|---|---|
| $R_1 =$ 751.56 | $d_1 =$ 16. | $N_1 =$ 1.43387 | $V_1 =$ 95.2 |
| $R_2 =$ −241.19 | $d_2 =$ 0.5 | | |
| $R_3 =$ −246.4 | $d_3 =$ 5. | $N_2 =$ 1.8061 | $V_2 =$ 40.9 |
| $R_4 =$ −517.34 | $d_4 =$ 0.5 | | |
| $R_5 =$ 270.97 | $d_5 =$ 12. | $N_3 =$ 1.43387 | $V_3 =$ 95.2 |

-continued

| | | | | | | |
|---|---|---|---|---|---|---|
| $R_6 =$ | −3511.86 | $d_6 =$ | variable | | | |
| $R_7 =$ | 106.09 | $d_7 =$ | 4. | $N_4 =$ 1.72342 | $V_4 =$ | 38.0 |
| $R_8 =$ | 463.13 | $d_8 =$ | 0.5 | | | |
| $R_9 =$ | 399.18 | $d_9 =$ | 2.5 | $N_5 =$ 1.6935 | $V_5 =$ | 53.3 |
| $R_{10} =$ | 67.67 | | | | | |

-continued

| Lens separation during focusing | | |
|---|---|---|
| Object distance from image plane | $d_6$ | f |
| Infinity | 294.2 | 600 |
| 10 meters | 336.0 | 509.7 |

* * * * *